(12) United States Patent
Vargantwar et al.

(10) Patent No.: US 8,305,991 B1
(45) Date of Patent: Nov. 6, 2012

(54) METHOD AND SYSTEM FOR SECTOR SWITCHING DURING PACKET TRANSMISSION

(75) Inventors: Sachin R. Vargantwar, Overland Park, KS (US); Siddarth S. Oroskar, Overland Park, KS (US); Manoj Shetty, Overland Park, KS (US); Ashvini Ganesh Canjeevaram, Burlington, MA (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1330 days.

(21) Appl. No.: 11/939,755

(22) Filed: Nov. 14, 2007

(51) Int. Cl.
*H04W 4/00* (2009.01)
(52) U.S. Cl. ......... 370/331; 370/329; 455/436; 455/438
(58) Field of Classification Search .................. 370/331, 370/236, 328, 252, 335, 336; 455/452.1, 455/436, 450, 458, 423
See application file for complete search history.

(56) References Cited

U.S. PATENT DOCUMENTS

| | | | |
|---|---|---|---|
| 7,466,981 B1 * | 12/2008 | Abdelhamid et al. | 455/438 |
| 2002/0160778 A1 * | 10/2002 | Hiramatsu et al. | 455/436 |
| 2003/0002525 A1 * | 1/2003 | Grilli et al. | 370/465 |
| 2005/0047354 A1 * | 3/2005 | Zeira et al. | 370/280 |

\* cited by examiner

*Primary Examiner* — Hassan Phillips
*Assistant Examiner* — Anez Ebrahim

(57) ABSTRACT

A method and apparatus for handing off packet-transmission between sectors of a wireless communication system is disclosed herein. During transmission of a packet from an access network to an access terminal, the access terminal determines that the packet should theoretically be transmitted to the access terminal in fewer timeslots in another sector than the number of allowed timeslots remaining for the packet transmission in a current sector. In response, the access terminal abandons packet transmission in the current sector and hands off to the other sector, in an effort to increase throughput and save air interface resources.

16 Claims, 5 Drawing Sheets

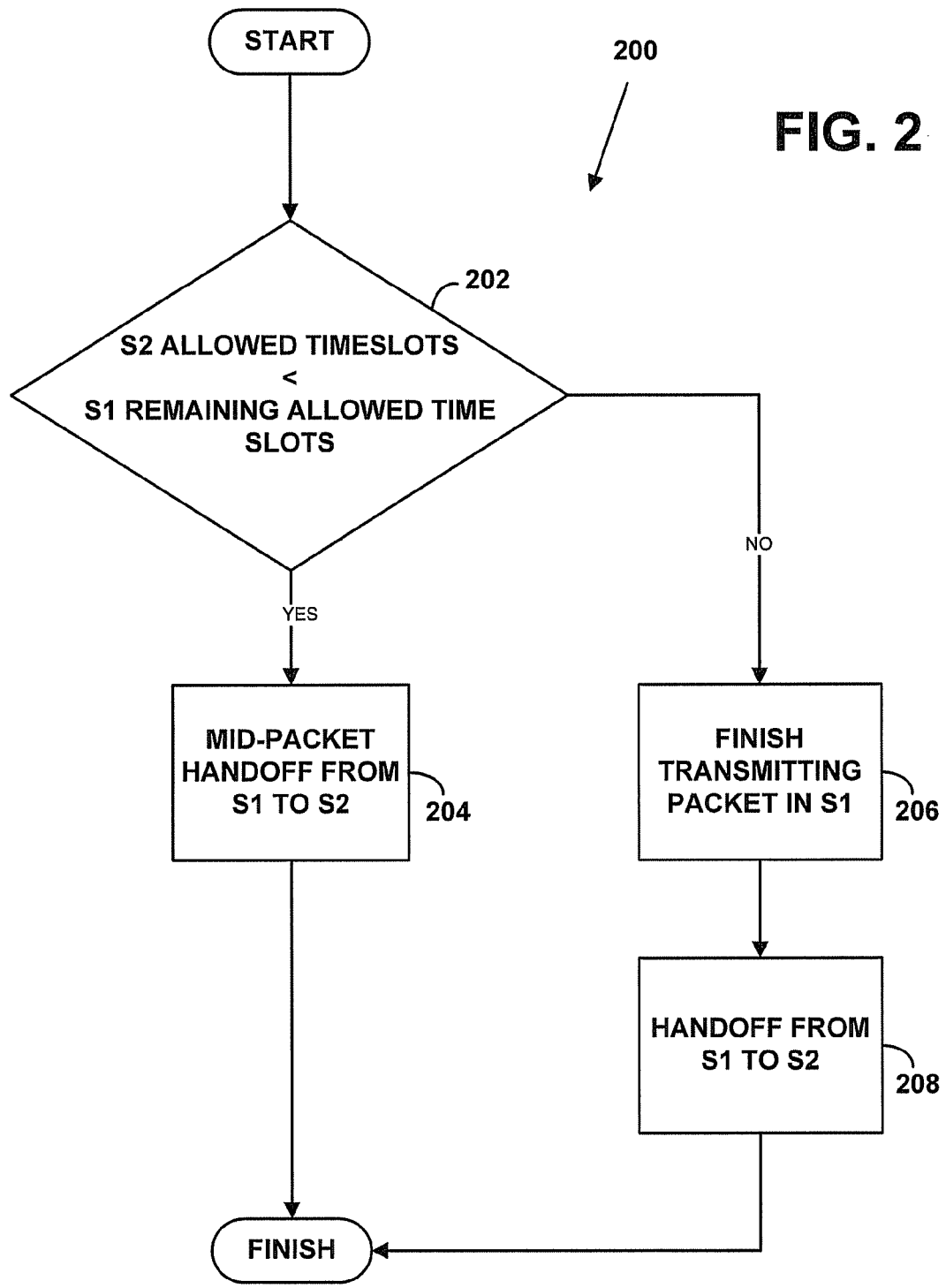

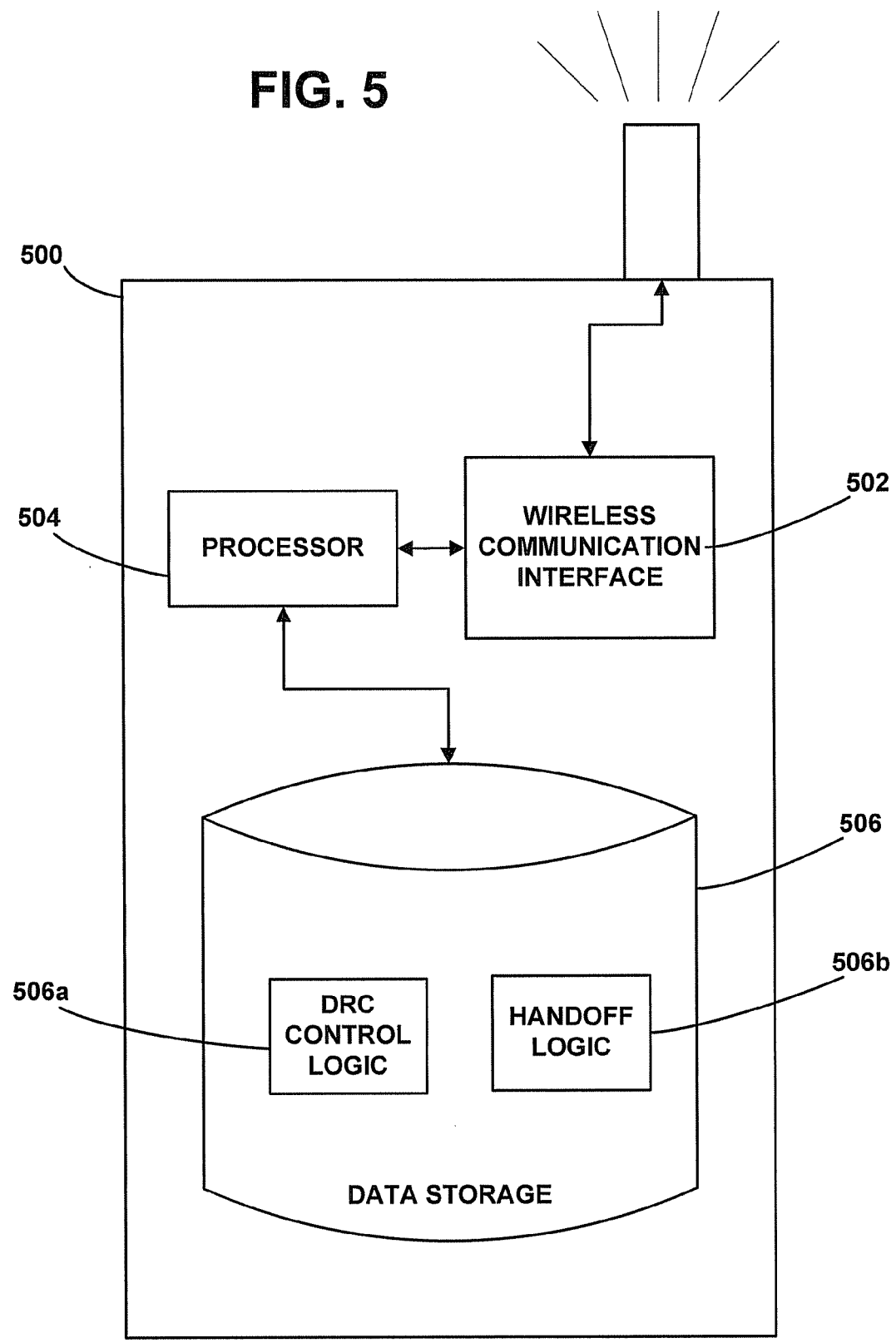

METHOD AND SYSTEM FOR SECTOR SWITCHING DURING PACKET TRANSMISSION

FIELD OF THE INVENTION

The present invention relates to wireless communications and, more particularly, to management of data communication between a radio access network and a radio access terminal. The invention can be advantageously applied in the context of high data rate wireless communications pursuant to EIA/TIA IS-856 (e.g., 1xEV-DO) Rel. 0 or Rel. A, for instance, but the invention may have broader applicability as well.

BACKGROUND

As wireless network infrastructure improves, the quantity and quality of information and services accessible via wireless access terminals is increasing rapidly. With the advent of 3G and emerging 4G wireless cellular networks, consumers can increasingly access a variety of multimedia content, browse the internet, access e-mail, etc. Wireless data can be transmitted to access terminals using a variety of wireless protocols, such as IS-2000, IS-856 (1xEV-DO), 802.11, and Bluetooth, among others.

In existing protocols, wireless data is divided into packets that are sent (usually sequentially) to the access terminal over an air interface. Generally, access networks transmit data to an access terminal in discrete timeslots, which the access terminal may allocate among a number of access terminals. Each access terminal may have, at a given point in time and for a given sector, a certain number of time slots in which to receive each packet. The number of timeslots may be a function of the network conditions between the access terminal and the access network (e.g., the quality of service over the air interface).

When the access terminal is receiving data from a cellular access network, the access terminal may travel between sectors of the access network. When this occurs, a handoff between sectors must be performed, so that the communication can continue in the sector into which the access terminal has moved. Under existing protocols, an access terminal generally waits until completion of current packet transmission (or until the allowed number of timeslots has passed) before handing off from a current serving sector to another sector. As a specific example, if the access terminal detects that a new sector has a better signal-to-noise ratio than its current sector, the access terminal must wait until it successfully receives the packet currently being transmitted or until the number of timeslots allowed for transmission of the packet have passed without success. The access terminal may then begin the handoff process.

SUMMARY OF THE INVENTION

The present invention helps enable an access terminal to hand off from one sector to another in the middle of packet transmission, i.e., before current transmission of a packet is complete. The invention occurs during the course of packet transmission to the access terminal in a first sector, sector S1, e.g., as the access network is attempting to transmit a given packet to the access terminal in sector S1. As a general matter, the access terminal will abandon current packet transmission in a first sector and hand off to receive the packet in a second sector if the access terminal determines that the packet transmission can occur in the second sector in a fewer number of timeslots than the number of allowed timeslots remaining in the current sector.

Accordingly, in a first respect, an exemplary embodiment of the invention may take the form of a method operable in a wireless communication system where an access network has an allowed number of timeslots in which to complete transmission of a packet over an air interface in a first sector to an access terminal. According to the method, the access terminal may first determine that an allowed number of timeslots in which the access network is to complete transmission of the packet in a second sector would be less than a remaining number of the allowed number timeslots in which the access network is to complete transmission of the packet in the first sector. In response, the access terminal may then abandon the packet transmission in the first sector and hand off to the second sector.

In this exemplary method, the act of abandoning the packet transmission in the first sector and handing off to the second sector may involve sending a number of null data rate control messages to the access network for the first sector, and then sending at least one data rate control message to the access network for the second sector to cause the access network to transmit to the access terminal in the second sector.

Further, the act of determining that an allowed number of timeslots in which the access network is to complete transmission of the packet in a second sector would be less than a remaining number of the allowed number timeslots in which the access network is to complete transmission of the packet in the first sector may involve (i) determining the allowed number of timeslots for the second sector, (ii) determining the remaining number of the allowed number of timeslots for the first sector, and (iii) comparing the determined allowed number of timeslots for the second sector with the determined remaining number of the allowed number of timeslots for the first sector and thereby determining that the determined allowed number of timeslots for the second sector is less than the determined remaining number of the allowed number of timeslots for the first sector.

In this regard, the act of determining the allowed number of timeslots for the second sector may involve (i) determining a C/I value for the second sector and (ii) mapping the determined C/I value to the allowed number of timeslots for the second sector. For instance, the access terminal may maintain a set of correlation data that correlates C/I values with allowed numbers of timeslots, and the act of mapping the determined C/I value to the allowed number of timeslots for the second sector may involve the access terminal referencing the correlation data.

In another respect, the exemplary embodiment may take the form of a method operable in a wireless communication system in which an access network attempts to transmit each packet to an access terminal over the course of up to an allowed number of timeslots in a given sector, where the allowed number is determined based on performance of the given sector as measured by the access terminal, and where transmission of the packet to the access terminal is considered complete upon the earlier of (i) the access terminal receiving the packet and (ii) the allowed number of timeslots passing. In that arrangement, when R of the allowed number of timeslots remain during transmission of a given packet to the access terminal in a first sector, and transmission of the given packet to the access terminal is not yet complete, the method may involve the access terminal determining that the allowed number of timeslots for a second sector is less than R, and the access terminal responsively abandoning the packet transmission in the first sector and handing off to the second sector.

In that way, the access network may then attempt to transmit the given packet to the access terminal in the second sector instead of continuing its attempt in the first sector.

In yet another aspect, an exemplary embodiment of the invention may take the form of an access terminal that includes a wireless communication interface, data rate control logic, and handoff logic. The wireless communication interface may operate to communicate via an air interface with an access network and to receive transmissions from the access network in timeslots interlaced with transmissions that are destined to other access terminals. The data rate control logic may operate to determine for a given sector a corresponding number of allowed timeslots in which the access network is to complete transmission of a given packet to the access terminal. And the handoff logic may operate, during transmission of a packet from the access network to the access terminal in a first sector having a first allowed number of timeslots, (a) to determine (i) that a second sector has a second allowed number of timeslots and (ii) that the second allowed number of timeslots is less than a remaining number of the first allowed number of timeslots, and (b) to responsively abandon the packet transmission in the first sector and handoff to the second sector.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Exemplary embodiments of the present invention is described herein with reference to the drawings, in which:

FIG. 2 is a simplified flow chart illustrating an exemplary method for mid-packet handoff;

FIG. 5 is a simplified block diagram illustrating an access terminal configured for mid-packet handoffs.

DETAILED DESCRIPTION OF THE INVENTION

Figure 1:
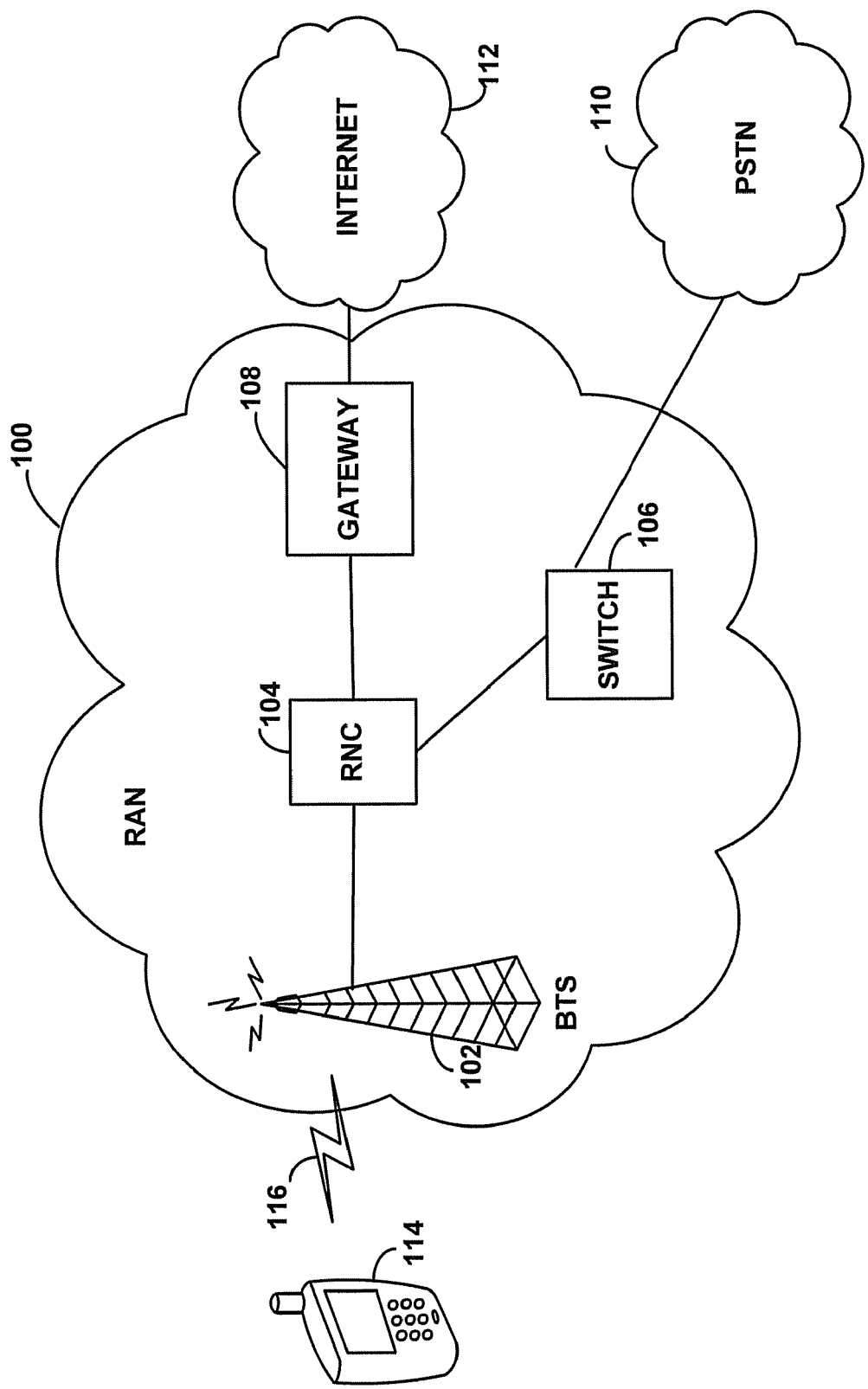
FIG. 1 is a simplified block diagram depicting an exemplary wireless communication system including a radio access network.

A wireless communication system may include one or many subsystems that operate to provide service to access terminals. FIG. 1 is a simplified block diagram depicting an exemplary wireless communication system including a radio access network (RAN) 100. Such a wireless communication system may be a part of a larger wireless communication system (which, for example, may include multiple interconnected RANs). In a RAN, such as RAN 100, a wireless carrier can implement numerous base transceiver station (BTS) towers 102, which helps provide contiguous coverage for wireless subscribers. Each BTS102 can be configured to define a respective cell site, as well as number of cell sectors. Groups of BTS towers in a given region will then typically be connected with a radio network controller (RNC) 104 (also known as a base station controller (BSC)), and the RNC may then connect with a switch 106 (e.g., a radio network controller (RNC), also referred to as a mobile switching center (MSC)) or gateway 108 (e.g., a packet-data serving node (PDSN)) that provides connectivity with a transport network such as the public switched telephone network (PSTN) 110 or the Internet 112 for instance.

With this arrangement, when an access terminal 114 (such as a cellular telephone or wirelessly-equipped portable computer or personal digital assistant, for instance) is positioned in a sector, the access terminal 114 may communicate via an RF air interface 116 with the serving BTS102. Consequently, a communication path can be established between the access terminal 114 and a transport network via air interface 116, BTS102, RNC 104 and switch 106 or gateway 108.

In a system employing EV-DO, air-interface communications on at least the forward link (i.e., communications directed from a RAN to access terminals) are divided into timeslots, and the network sends bearer data to just one access terminal per time slot, using the full sector transmission power. This arrangement results in improved transmission of data bursts (e.g., multiple packets of data) to the access terminal. In EV-DO, the RNC or another network entity applies a scheduling algorithm to determine which access terminal a sector should serve in each time slot and further to determine the rate at which to transmit data to the served access terminal in the time slot. It should be understood that in later versions of EV-DO, multi-user timeslots are contemplated. The present invention can apply in those later versions as well.

According to IS-856, an access terminal regularly monitors the signal-to-noise ratio (C/I) of pilot signals that the access terminal receives from the cell sectors in its vicinity. The access terminal then selects as a serving sector, the sector with a pilot signal having the highest signal-to-noise ratio, and the access terminal uses that signal-to-noise ratio as a basis to select a data rate at which to request the sector to transmit data to the access terminal. In particular, IS-856 defines a fixed mapping between C/I and "Data Rate Control" (DRC) codes, with each DRC corresponding to a given range of C/I values and defining a particular data rate. Applying that mapping, the access terminal selects a DRC code and sends a DRC control channel message over the air to the access network, identifying (i) the DRC code and (ii) the selected sector.

Each DRC code defines a data rate by corresponding with a maximum number of air interface timeslots that the access network will use when it attempts to transmit each radio link layer data packet to the access terminal. (In practice, the timeslots used for transmission to a given access terminal will be interlaced with timeslots used for transmission to other access terminals.) In particular, the higher the DRC, the fewer the timeslots, and thus in theory the quicker the data transmission will occur to the access terminal. This correspondence logically follows from the fact that a higher DRC corresponds with a higher C/I, leading to better air interface conditions supporting quicker successful transmission to the access terminal.

In general, an RNC may engage in multiple transmissions to multiple access terminals concurrently (e.g., with at least a portion, but not necessarily the entirety, of the transmissions overlapping). In such embodiments, an RNC may be said to "interlace" transmissions or may be said to engage in "interlacing" transmissions. For example, an RNC may interlace two transmissions (to two different access terminals) by beginning transmission of at least one packet of a second transmission before a first transmissions is complete, and subsequently completing the first transmission (although in practice, the RNC generally switches between the first and second transmission more frequently).

In a communication session, the access network may have up to an allowed number of timeslots in which to complete transmission of the packet to the access terminal in a sector. Under IS-856, the allowed number of timeslots may be determined based on the access terminal's DRC, as measured by the access terminal. As the DRC may be based on the C/I of the sector in which the communication is occurring, the allowed number of timeslots may ultimately be determined by the C/I of the sector.

For a given DRC corresponding with a particular number of timeslots, the access network repeatedly attempts transmission of the packet to the access terminal in sequential (interlaced) timeslots, adding more error correction coding in each timeslot and/or transmitting various portions of the packet with various error correction coding in each timeslot, with the goal that the access terminal will ultimately receive enough data to constitute or facilitate uncovering of the packet as a whole. For instance, if the packet payload comprises the elements ABCD, the access network may transmit in the first timeslot the full payload ABCD plus some error correction coding. If that transmission is insufficient, the access network may then transmit in the next timeslot a portion of the payload, such as ABC, plus some additional error correction coding. And if that transmission is still insufficient, the access network may then transmit in the next timeslot another portion of the payload, such as BDC, plus more substantial error correction coding. This process would continue until the packet transmission is successful or until the number of timeslots is exhausted (in which case the transmission would have failed).

During this packet transmission process, for each timeslot that does not result in the access terminal having successfully received or uncovered the complete packet payload, the access terminal transmits a negative acknowledgement (NACK) to the access network, to prompt the access network to keep trying if additional timeslots remain. On the other hand, once the access terminal has received the complete packet, the access terminal transmits a positive acknowledgement (ACK) to the access network, which tells the access network that transmission of the packet was successful. If successful receipt of a given packet occurs before the allocated number of timeslots have passed, the access network then proceeds to the next packet, saving timeslot resources by not having to re-transmit the given packet or a portion of the given packet again.

While engaged in the communication session, an access terminal may remain stationary, staying within a single cell or sector. However, access terminal may also move throughout a coverage area (e.g., move between cells and/or sectors) during the communication session. When an access terminal moves between sectors, a handoff from one sector to another may occur. In particular, when an access terminal is engaged in a communication in a first sector, and moves from the first sector to a second sector, a handoff to the second sector may occur, allowing for continuation of the communication in the second sector.

According to IS-856, if an access terminal has been receiving transmissions on a given sector and discovers that another sector is exhibiting a stronger signal-to-noise ratio, the access terminal will ask the access network to begin serving the access terminal on the new sector instead. In particular, once the access terminal finishes receiving any packet currently being transmitted on the current sector, the access terminal would begin the handoff process by sending a series of null DRC messages on its current sector, to notify the access network that the access terminal is about to hand off to another sector, so that the access network will hold any packets destined for the access terminal until the handoff is complete. The access terminal would then begin sending DRCs on the new sector, to cause the access network to begin transmitting packets to the access terminal on the new sector.

For simplicity, the sectors involved in a handoff from a first sector to a second will be described as sector S1 and sector S2, respectively. Sector S1 should be generally understood to refer to a sector in which a communication is occurring when it is determined a handoff will occur. Sector S2 should be generally understood to refer to a sector in which the communication will occur after the handoff. Also for simplicity, a handoff performed according to an exemplary method may be referred to as a "mid-packet handoff." For example, it may be said that if the allowed number of timeslots for sector S2 is less than the remaining number of allowed timeslots for sector S1, then a mid-packet handoff is performed. This terminology is for the purpose of simplification, and should not be taken to limit the scope of the invention.

It should be understood that an exemplary method may be integrated with existing handoff techniques. For example, during a transmission of packets to an access terminal in sector S1, a determination may first be made that sector S2 has a higher C/I than sector S1. Based on this determination, the exemplary method may be employed to determine whether a handoff should be performed mid-packet. Further, if the allowed number of timeslots for sector S2 is not less than the remaining number of the allowed timeslots for sector S1, and a handoff is not performed mid-packet, a hand-off may nonetheless be performed after the allowed number of timeslots for sector S1. Specifically, if the packet is successfully received in sector S1 (e.g., the access terminal sends an ACK), a handoff to sector S2 may be performed before sending the next packet in the transmission.

FIG. 2 is a simplified flow chart illustrating an exemplary method 200 for mid-packet handoff. Generally, during a communication session involving an access terminal and an access network, it may be determined that a mid-packet handoff is beneficial (e.g., results in quicker transmission of a packet). Specifically, while transmitting a packet, an access terminal may determine that the allowed number of timeslots to complete transmission of a packet in a second sector (sector S2) would be less than the remaining number of the allowed number timeslots to complete transmission of the packet in the first sector (sector S1), as shown by block 202. In this situation, a mid-packet handoff is performed by ceasing the transmission of the packet in sector S1, and continuing the communication by transmitting the packet in sector S2, as shown by block 204.

In other situations, a mid-packet handoff may not be beneficial, and accordingly a mid-packet handoff is not performed. For example, a conventional handoff, may be performed by completing transmission of the packet (or attempting to complete transmission by waiting for allowed number of timeslots) in sector S1, as shown by block 206. Then, after transmission of the packet in sector S1, a handoff from sector S1 to sector S2 may be performed, as shown by Preferably, during the course of packet transmission to the access terminal in sector S1, the access terminal will determine that another sector, sector S2, should be able to support transmission of the packet with a fewer number of timeslots than the number remaining for transmission of the packet in sector S1. In particular, based on the C/I that the access terminal measures for sector S2, the access terminal may determine a DRC code and thus an allowed number of timeslots for sector S2. Further, the access terminal may determine how many timeslots are left of the allowed number of timeslots for sector S1. The access terminal will then compare the allowed number of timeslots for sector S2 with the remaining number of the allowed timeslots for sector S1.

The access terminal may employ the exemplary method after a beginning timeslot of the allowed number of timeslots for the first sector has passed. Thus, the exemplary method may further involve the access terminal determining that R of the allowed number of timeslots remain during transmission of the given packet to the access terminal in the first sector and that transmission of the given packet to the access terminal is not yet complete. Under IS-856, as discussed above, the allowed number of timeslots may be determined based on the access terminal's DRC, which may be based on the C/I of sector S1, as measured by the access terminal. Preferably, both the access terminal and the access network know the allowed number of timeslots, based on the DRC that the access terminal sends to the access network to trigger the transmission in sector S1. The access terminal may track the timeslots that have passed during transmission of a packet, and subtract the timeslots that have passed from the allowed number of timeslots in sector S1 to determine the remaining number of allowed timeslots in sector S1.

Similarly, the access terminal may determine or learn of the allowed number of timeslots in sector S2 (the sector in which the access terminal will be communicating after the handoff).

In particular, the access terminal may use the C/I of sector S2 to calculate the allowed number of timeslots in sector S2. For example, the act of determining that the allowed number of timeslots for the second sector is less than R may involve (i) determining a C/I value for the second sector, and (ii) mapping the determined C/I value to a data rate control value corresponding with the allowed number of timeslots for the second sector, and thus mapping the C/I value to the allowed number of timeslots for the second sector. The access terminal may maintain in data storage a set of correlation data that correlates C/I values with data rate control values. In this case, the act of mapping the determined C/I value to the data rate control value corresponding with the allowed number of timeslots for the second sector may involve referencing the correlation data.

If the allowed number of timeslots for sector S2 is less than the remaining number of the allowed timeslots for sector S1, then the access terminal will abandon the packet transmission in sector S1 and will immediately begin a handoff to sector S2. For instance, the access terminal may send any necessary sequence of null-DRCs to the access network in sector S1, to prepare the access network for the handoff, and the access terminal may then begin sending DRCs to the access network in sector S2 to trigger packet transmission to the access terminal in sector S2. Since transmission of the packet was not yet complete in sector S1, the access network would then preferably engage in transmission of the packet to the access terminal in sector S2. On the other hand, if the allowed number of timeslots for sector S2 is not less than the remaining number of the allowed timeslots for sector S1, the access terminal may refrain from performing a mid-packet handoff. Specifically, the access terminal may allow the packet transmission to continue in sector S1, then send any necessary sequence of null-DRCs to the access network in sector S1, preparing the access network for the handoff to sector S2.

It should be understood that the null-DRC transmission that IS-856 would require to facilitate handoff between sectors largely cancels out when considering the value of the present invention, as the same null-DRC transmission would be required in any event even if handoff would occur after completion of packet-transmission in sector S1. Further, in a preferred embodiment, the invention will apply in a wireless communication system where all of the packets to be transmitted from the access network to the access terminal are fixed length (even if zero-padded).

It should also be understood that a mid-packet handoff is one that occurs after initiating packet transmission and before the packet transmission in sector S1 is complete. The packet transmission can be considered to have started once the access terminal sends a non-null DRC to the access network, requesting packet-transmission in sector S1 where the packet is first in line for the access network to transmit to the access network. Further, the access terminal may apply the method after the access terminal has requested the access network to transmit the given packet to the access terminal in the first sector, such as (i) after the access terminal has sent a data rate control message to the access network requesting transmission to the access terminal in the first sector and (ii) when the given packet is first line to be transmitted from the access network to the access terminal (so that the data rate control message would apply to that packet). A transmission of a packet may be considered complete upon the earlier of (i) successful packet transmission (i.e., receipt or uncovering by the access terminal of the full packet payload) or (ii) passage of the allowed number of timeslots for the sector.

As a specific example, if the access terminal's DRC for sector S1 corresponds with eight allowed timeslots, the invention may occur anytime between (a) the moment when the first of those eight timeslots begins (or has passed) and (b) the earlier of the moment when the access terminal successfully receives the packet and when the 8th timeslot passes. As another example, if the access terminal's DRC for sector S1 corresponds with 16 allowed timeslots, the invention may occur anytime between (a) the moment when the first of those 16 timeslots begins (or has passed) and (b) the earlier of the moment when the access terminal successfully receives the packet and when the 16th timeslot passes.

Figure 3A:
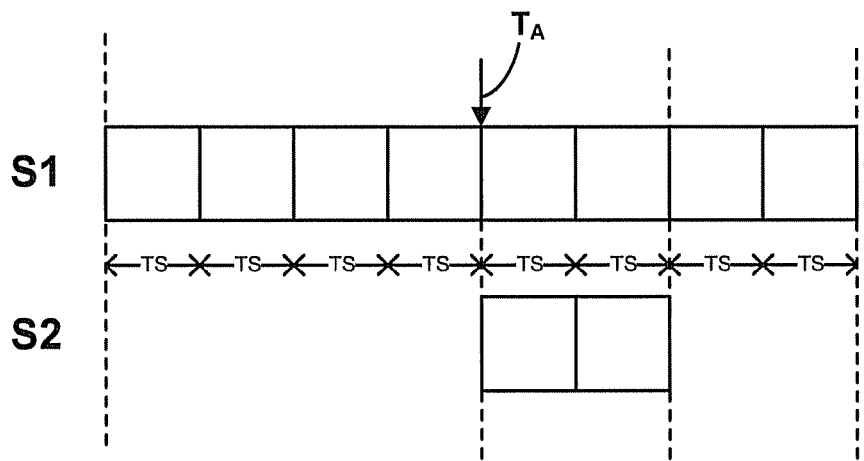
FIG. 3A is a simplified block diagram illustrating allowed time slots in a first sector and in a second sector at a given point time during packet transmission from an access network to an access terminal.
Figure 3B:
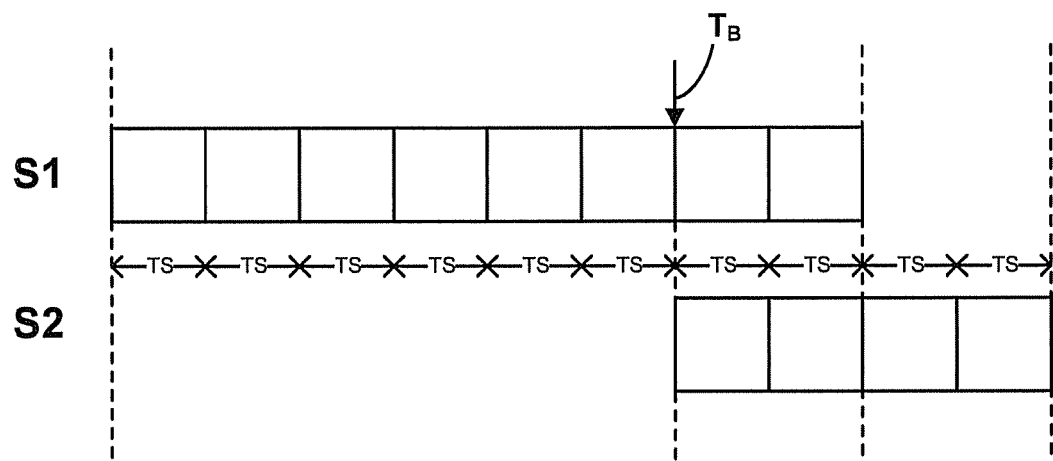
FIG. 3B is another simplified block diagram illustrating allowed time slots in a first sector and in a second sector at a given point time during packet transmission from an access network to an access terminal.

FIGS. 3A-C are simplified block diagram illustrating allowed time slots in sector S1 and sector S2 at a given point time $T_A$, $T_B$, and $T_C$, respectively, during packet transmissions from an access network to an access terminal. Each block of width TS represents an allowed timeslot for transmission of a packet. FIG. 3A represents a scenario where, at time $T_A$, the access terminal's DRC for sector 51 corresponds with eight timeslots. Further, at time $T_A$, the access terminal detects a C/I for sector S2 that corresponds with two allowed timeslots. If a packet transmission in sector S1 is ongoing at time $T_A$, the access terminal may determine that four allowed timeslots remain in sector S1 and that the packet transmission is not yet complete. Since the allowed time slots in sector S2 (2) are less than the remaining allowed timeslots in sector S1 (4), the access terminal may attempt to speed up transmission of the packet by performing a mid-packet handoff. Consequently, the access terminal may invoke a mid-packet handoff according to an exemplary method (such as that illustrated by FIG. 2, for instance).

FIG. 3B represents a scenario where, at time $T_B$, the access terminal's DRC for sector S1 corresponds with eight timeslots. Further, at time $T_B$, the access terminal detects a C/I for sector S2 that corresponds with four allowed timeslots. If a packet transmission in sector S1 is ongoing at time $T_B$, the access terminal may determine that two allowed timeslots remain in sector S1 and that the packet transmission is not yet complete. Since the allowed time slots in sector S2 (4) are greater than the remaining allowed timeslots in sector S1 (2), the access terminal refrains from performing a mid-packet handoff. Once the packet transmission in sector Si is complete, however, the access terminal may then conventionally invoke a handoff to sector S2 if the C/I for sector S2 is higher than the C/I for sector S1, by sending any required null-DRCs in sector S1 and then beginning to send DRCs in sector S2.

Figure 4:
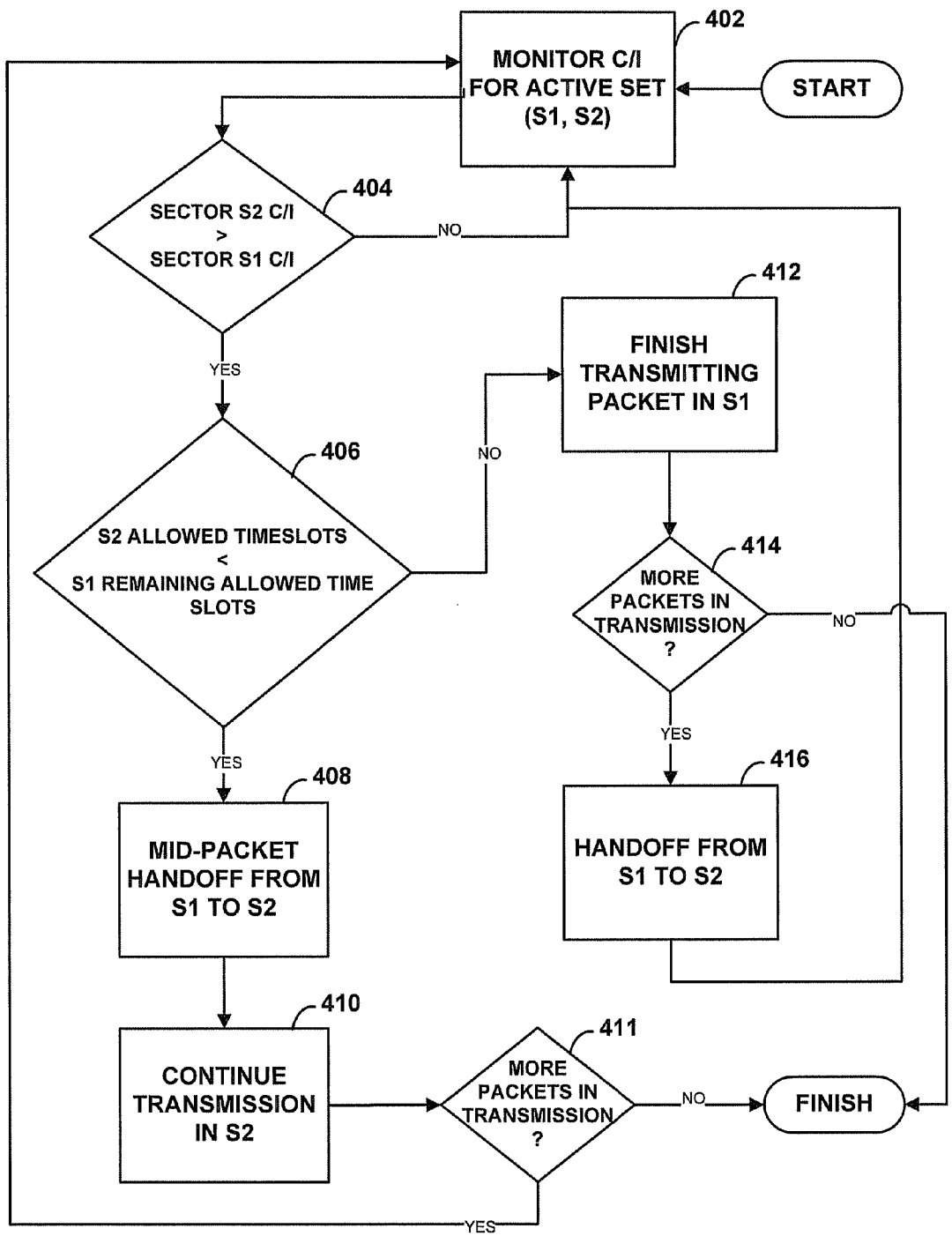
FIG. 4 is a simplified flow chart illustrating the use of an exemplary method in a transmission of data comprising multiple packets.

FIG. 4 is a simplified flow chart illustrating the use of an exemplary method in a transmission of data comprising multiple packets. Generally, the access terminal monitors C/I in one or more sectors making up the active set. During transmission the access terminal monitors the C/I in sector S1 and the C/I in sector S2, as shown by block 402. Periodically or from time to time, the access terminal determines whether the C/I in sector S1 is greater than the C/I in sector S2, as shown by block 404. If the C/I in sector S1 is not greater than the C/I in sector S2, then the access terminal simply continues the transmission. However, if the access terminal determines that the C/I in sector S2 is greater than the C/I in sector S1, the access terminal initiates the hand-off process. After it is generally determined a handoff will be performed, the access terminal determines whether or not to perform a mid-packet handoff by comparing the remaining allowed timeslots in sector S1 to the allowed timeslots in sector S2, as shown by block 406. Specifically, if the number of allowed timeslots in sector S2 is less than the remaining allowed timeslots in sector S1, the access terminal instructs the access network to perform a mid-packet handoff to sector S2. In an alternative embodiment, an RNC or other network entity may detect or learn that conditions are such that a mid-packet handoff should be performed. In either case, a mid-packet handoff is performed from sector S1 to sector S2, as shown in block 408. The transmission then continues in sector S2, as shown by block 410. Specifically, transmission of the packet in sector S1 ceases. The packet (and possibly one or more of the following packets making up the transmission) is then transmitted to the access terminal in sector S2. Then, it is determined whether or not more packets remain for transmission, as shown by block 411. If packets remain to be transmitted to the access terminal, the access terminal continues to monitor the C/I for the active set, as shown by block 402, and perform handoffs and/or mid-packet handoffs as necessary. For example, if network conditions change so that the C/I in another sector (such as S1, for instance) is greater than the C/I in sector S2 and/or the number of remaining allowed timeslots in sector S2 is greater than (or possibly equal to) the allowed timeslots the other sector, a handoff (and possibly a mid-packet handoff) to the other sector may be performed.

If the C/I in sector S2 is greater than the C/I in sector S1, but the number of allowed timeslots in sector S2 is greater than (or possibly equal to) the remaining allowed timeslots in sector S1, the transmission of the packet is completed in sector S1, as shown by block 412. Then, it is determined whether or not more packets remain for transmission, as shown by block 414. If packets remain to be transmitted to the access terminal, a handoff to sector S2 is performed, and the access terminal begins receiving the next packet in sector S2, as shown by block 416. Further, the access terminal continues to monitor the C/I for the active set, as shown by block 402, and perform handoffs and/or mid-packet handoffs as necessary.

Some embodiments may consider whether or not a packet being transmitted is the last packet to be transmitted, when determining whether or not to perform a mid-packet handoff. As previously noted, the null-DRC transmission that IS-856 requires to facilitate handoff between sectors largely cancels out when considering the value of the present invention. However, in the case where the packet being transmitted is the last packet being transmitted, a standard handoff is never actually performed, as transmission of the packet is completed in the current sector. In this scenario, a mid-packet handoff may unnecessarily use timeslots for a handoff to another sector, for transmission of the last packet. Thus, if a packet is the last packet to be transmitted, a mid-packet handoff may be performed when the number of allowed time slots in sector S2 plus the number of time slots for the null-DRC transmission (e.g., four timeslots in IS-856) is less than the number of remaining allowed timeslots in sector S1.

FIG. 5 is a simplified block diagram illustrating an access terminal 500 configured for mid-packet handoffs. The access terminal 500 may take the form of any type of wireless communication device, such as a cellular phone, PDA, laptop computer, or personal computer, among others. The access terminal 500 includes a wireless communication interface 502 that is configured to communicate via an air interface with an access network. The wireless communication interface 502 may also be configured to receive transmissions from the access network in timeslots interlaced with transmissions destined to other access terminals. The access terminal 500 also includes a processor 504 that is configured to execute program logic stored in data storage 506. The program logic may include DRC control logic 506a and handoff logic 506b.

The DRC control logic 506a may be executable to determine the number of remaining allowed timeslots and/or the number of allowed timeslots for a given sector. In particular, the number of allowed timeslots for a given sector may be determined by measuring the C/I for the sector and using the C/I as a basis to calculate the number of allowed timeslots. The number of remaining allowed timeslots may be determined by tracking the number of timeslots from that have passed from the initiation of a packet transmission, and subtracting the number of passed timeslots from the number of allowed timeslots for the sector.

In the exemplary access terminal, the handoff logic would function to determine the second allowed number of timeslots by determining a C/I value for the second sector and mapping the determined C/I value to the second allowed number of timeslots. For instance, the access terminal may include data storage that contains correlation data that maps C/I values to allowed numbers of timeslots, and the handoff logic may operate to determine the second number of timeslots based on the determined C/I value by referencing the correlation data.

The handoff logic 506b may be configured to determine the number of remaining allowed timeslots in a first sector a number of allowed timeslots in a second sector. Further, the handoff logic 506b may be executed to compare the number of remaining allowed timeslots in the first sector to the number of allowed timeslots in a second sector. In particular, a determination may be made that the second allowed number of timeslots is less than a remaining number of the first allowed number of timeslots.

In response to a determination that the second allowed number of timeslots is less than a remaining number of the first allowed number of timeslots, handoff logic 506b may cause the access terminal to abandon the packet transmission in the first sector and handoff to the second sector. Specifically, handoff logic 506b may cause the access terminal to handoff by sending a number of null data rate control messages to the access network for the first sector and then sending at least one data rate control message to the access network for the second sector to cause the access network to transmit to the access terminal in the second sector.

In some embodiments, the RNC or another entity of the access network may be configured to support mid-packet handoffs between sectors. Specifically, packets are sent to the BTS providing service in the access terminal's current sector, for transmission to the access terminal. Copies of each packet are also sent to the BTS or BTSs serving the other sectors in the access terminal's active set (if these sectors are served by a different BTS than the current sector). Notably, an access terminal generally selects a sector to handoff to, from the active set. Therefore, provided with this configuration, the packet will be queued and ready for transmission at the new sector, after a mid-packet handoff occurs. In addition, the access terminal may facilitate this functionality by providing the RNC with the sectors in the active set, so the packets may be distributed to the BTSs serving these sectors (if necessary).

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. Those skilled in the art will understand that changes and modifications may be made to these embodiments without departing from the true scope and spirit of the invention, which is defined by the claims.

We claim:

1. In a wireless communication system where an access network has a first allowed number of timeslots in which to complete transmission of a packet over an air interface in a first sector to an access terminal, a method comprising:
   the access terminal determining a remaining number of the first allowed number of timeslots in which the access network is to complete transmission of the packet in the first sector;
   the access terminal determining a signal to noise ratio (C/I) value for a second sector;
   the access terminal using correlation data that correlates signal to noise ratio (C/I) values with allowed numbers of timeslots as a basis for mapping the determined signal to noise ratio (C/I) value to a second allowed number of timeslots in which the access network is to complete transmission of the packet in a second sector,
   the access terminal determining that the second allowed number of timeslots is less than the remaining number of the first allowed number of timeslots; and
   the access terminal responsively abandoning the packet transmission in the first sector and handing off to the second sector.

2. The method of claim 1, wherein abandoning the packet transmission in the first sector and handing off to the second sector comprises:
   sending a number of null data rate control messages to the access network for the first sector, and then sending at least one data rate control message to the access network for the second sector to cause the access network to transmit to the access terminal in the second sector.

3. The method of claim 1, further comprising:
   maintaining in data storage at the access terminal the correlation data that correlates C/I values with allowed numbers of timeslots.

4. The method of claim 1, wherein relevant timeslots for the access terminal are interlaced with timeslots for other access terminals.

5. In a wireless communication system in which an access network attempts to transmit each packet to an access terminal over the course of up to an allowed number of timeslots in a given sector, wherein the allowed number is determined based on performance of the given sector as measured by the access terminal, and wherein transmission of the packet to the access terminal is considered complete upon the earlier of (i) the access terminal receiving the packet and (ii) the allowed number of timeslots passing, a method comprising:
   when a remaining number of a first allowed number of timeslots remain during transmission of a given packet to the access terminal in a first sector, and transmission of the given packet to the access terminal is not yet complete, the access terminal:
      (a) determining a signal to noise ratio C/I value for a second sector;
      (b) using correlation data that correlates signal to noise ratio C/I values with allowed numbers of timeslots as a basis for mapping the determined signal to noise ratio C/I value to a second allowed number of timeslots in which the access network is to complete transmission of the packet in a second sector; and
      (c) determining that the second allowed number of timeslots is less than the remaining number; and
   the access terminal responsively abandoning the packet transmission in the first sector and handing off to the second sector and transmitting the given packet to the access terminal in the second sector instead of in the first sector.

6. The method of claim 5, further comprising:
   the access terminal determining that the remaining number of the first allowed number of timeslots remain during transmission of the given packet to the access terminal in the first sector and that transmission of the given packet to the access terminal is not yet complete.

7. The method of claim 6, further comprising applying the method after transmission of the given packet to the access terminal in the first sector has started.

8. The method of claim 7, wherein applying the method after transmission of the given packet to the access terminal in the first sector has started comprises applying the method after a beginning timeslot of the first allowed number of timeslots for the first sector has passed.

9. The method of claim 7, wherein applying the method after transmission of the given packet to the access terminal in the first sector has started comprises applying the method after the access terminal has requested the access network to transmit the given packet to the access terminal in the first sector.

10. The method of claim 9, wherein applying the method after the access terminal has requested the access network to transmit the given packet to the access terminal in the first sector comprises applying the method (i) after the access terminal has sent a data rate control message to the access network requesting transmission to the access terminal in the first sector and (ii) when the given packet is first line to be transmitted from the access network to the access terminal.

11. The method of claim 5, wherein abandoning the packet transmission in the first sector and handing off to the second sector comprises:
   sending a number of null data rate control messages to the access network for the first sector, and then sending at least one data rate control message to the access network for the second sector to cause the access network to transmit to the access terminal in the second sector.

12. The method of claim 5, further comprising:
   maintaining in data storage at the access terminal the correlation data that correlates C/I values with data rate control values.

13. The method of claim 5, wherein relevant timeslots for the access terminal are interlaced with timeslots for other access terminals.

14. An access terminal comprising:

a wireless communication interface operable to communicate via an air interface with an access network and to receive transmissions from the access network in timeslots interlaced with transmissions destined to other access terminals;

data rate control logic operable to determine a first corresponding number of allowed timeslots in which the access network is to complete transmission of a given packet to the access terminal in a given sector; and handoff logic operable, during transmission of a packet from the access network to the access terminal in a first sector having a first allowed number of timeslots, (a) to determine a remaining number of the first allowed number of timeslots in which the access network is to complete transmission of the packet in the first sector, (b) to determine a signal to noise ratio signal to noise ratio C/I value for a second sector, (c) use correlation data that correlates signal to noise ratio C/I values with allowed numbers of timeslots as a basis to map the determined signal to noise ratio C/I value to a second allowed number of timeslots in which the access network is to complete transmission of the packet in a second sector; and (d) to determine that the second allowed number of timeslots is less than a remaining number of the first allowed number of timeslots, and (e) to responsively abandon the packet transmission in the first sector and handoff to the second sector.

15. The access terminal of claim 14, wherein the handoff logic abandons the packet transmission in the first sector and hands off to the second sector by sending a number of null data rate control messages to the access network for the first sector, and then sending at least one data rate control message to the access network for the second sector to cause the access network to transmit to the access terminal in the second sector.

16. The access terminal of claim 14, wherein the wireless communication interface operable to communicate via the air interface with the access terminal under the IS-856 (EV-DO) protocol.

\* \* \* \* \*